United States Patent
Chafni et al.

(10) Patent No.: US 12,455,858 B2
(45) Date of Patent: Oct. 28, 2025

(54) SALIENCY-BASED COMPRESSION

(71) Applicant: 214 Technologies, Inc., Los Angeles, CA (US)

(72) Inventors: Nezare Chafni, Santa Monica, CA (US); Shaun Moore, Siesta Key, FL (US)

(73) Assignee: 214 TECHNOLOGIES, INC., Mclean, VA (US)

( * ) Notice: Subject to any disclaimer, the term of this patent is extended or adjusted under 35 U.S.C. 154(b) by 322 days.

(21) Appl. No.: 17/387,935

(22) Filed: Jul. 28, 2021

(65) Prior Publication Data

US 2023/0029608 A1 Feb. 2, 2023

(51) Int. Cl.
*G06F 16/16* (2019.01)
*G06N 20/00* (2019.01)
*G06T 9/00* (2006.01)

(52) U.S. Cl.
CPC ........... *G06F 16/164* (2019.01); *G06N 20/00* (2019.01); *G06T 9/00* (2013.01)

(58) Field of Classification Search
None
See application file for complete search history.

(56) References Cited

U.S. PATENT DOCUMENTS

| | | | |
|---|---|---|---|
| 2014/0270553 A1* | 9/2014 | Zund | H04N 19/14 |
| | | | 382/233 |
| 2021/0132688 A1* | 5/2021 | Kim | H04N 19/164 |
| 2021/0174497 A1* | 6/2021 | Yoo | G06F 18/24 |
| 2022/0382717 A1* | 12/2022 | Zhang | G06F 16/1744 |

* cited by examiner

*Primary Examiner* — Amresh Singh
(74) *Attorney, Agent, or Firm* — Maschoff Brennan (57) ABSTRACT

A method may include obtaining a machine learning model configured to label media files of a given type. The method may include obtaining a saliency map including multiple elements corresponding to aspects of the given type of media files, each element corresponding to encoding parameters. A given encoding parameter of an associated element may be based on an identified salience of the associated element in the machine learning model determining a label. The method may include obtaining a first media sample of the given type. The method may include deriving a second media sample from the first media sample based on applying the given encoding parameter to the associated element of the first media sample according to the saliency map. The method may include labeling, by the machine learning model, the second media sample.

15 Claims, 8 Drawing Sheets

SALIENCY-BASED COMPRESSION

The present disclosure generally relates to saliency-based compression.

BACKGROUND

Media files may include image, audio, and/or video data. Media files may include a file size dependent on an amount of data included in the media file. Some media files may include large file sizes that are too large to store and/or transmit effectively. Such media files may take up too much of a user's disk space and/or exceed file-sharing size limits for file-sharing services such that the media files may not be shared using said file-sharing services. Media files may be compressed to reduce the file size. Compression of media files may include encoding the media files using fewer bits than the number of bits originally used to encode the media files. Compression of media files may include reducing quality of and/or deleting bits used to encode the media files.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments may include a method including obtaining a machine learning model configured to label media files of a given type. The method may include obtaining a saliency map including multiple elements corresponding to aspects of the given type of media files, each element corresponding to encoding parameters. A given encoding parameter of an associated element may be based on an identified salience of the associated element in the machine learning model determining a label. The method may include obtaining a first media sample of the given type. The method may include deriving a second media sample from the first media sample based on applying the given encoding parameter to the associated element of the first media sample according to the saliency map. The method may include labeling, by the machine learning model, the second media sample.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Media compression may reduce a size of a media file, allowing for faster transmission and/or reception of the media file. However, some media compression schemes may fail to consider the importance of specific elements of a media file to perception and/or understanding of the media file by human users and/or computers. Such media compression schemes may apply uniform compression across all elements of the media file resulting in compression of both significant and insignificant elements of the media file. Because a user's overall perception and/or understanding of the media file may depend on the significant elements more than the insignificant elements, uniform compression of the media file may hinder the user's interaction with and/or comprehension of the media file. Additionally, such compression may limit the effectiveness of machine learning systems such as facial recognition systems, object detection systems, alpha-numerical recognition systems, voice recognition systems, etc.

Compression of the media file may be improved by selecting elements of the media file for reduced quality and/or deletion that may be nonessential to human and/or machine perception of the media file. For example, a digital image may be compressed by removing bits encoding certain colors without substantially affecting overall perception of the image. As another example, an audio file may be compressed by removing non-audible and/or less audible aspects of an audio file.

The embodiments of the present disclosure may relate to, among other things, constructing a saliency map associated with a given medium and compressing and/or otherwise modifying media samples associated with the given medium based on the saliency map. The saliency map may be constructed based on media samples provided in the given medium. The saliency map may indicate an importance of various elements constituting each of the media samples in the given medium (e.g., the importance of given pixels in a digital image, the importance of various frequencies in an audio file, etc.). The importance of an element of a given media sample may be determined by making an adjustment to a value representing an amount of compression for the element and determining the effect the adjusted value has on the given media sample overall. A media sample compressed based on the saliency map may preserve the perceived quality of elements of the media sample that influence user and/or machine perception of the media sample while appreciably reducing the size of the media sample by compressing elements that do not affect perception of the media sample, or do not affect perception of the media sample to the same extent. For example, quality of a video call may be improved by applying a saliency map to facial features captured during the video call. As another example, emotion detection in still images and/or video feeds may be improved by applying a saliency map focusing on (e.g., reducing compression of) eyes, eyebrows, mouths, etc. displayed in the still images and/or video feeds.

Compressing and/or otherwise modifying media samples according to the present disclosure may improve operation of machine learning models and/or computers implementing the machine learning models. Machine learning models configured to label media files may perform more effectively when provided with media files compressed based on the saliency map because elements of the media files relevant to the labeling may be emphasized according to the present disclosure. Such machine learning models may more accurately and/or more quickly label media files. Media files compressed based on the saliency map may be stored by the computer more easily due to the reduced file size without an accompanying decrease in perceived quality of the media files.

Embodiments of the present disclosure are explained with reference to the accompanying figures.

Figure 1:
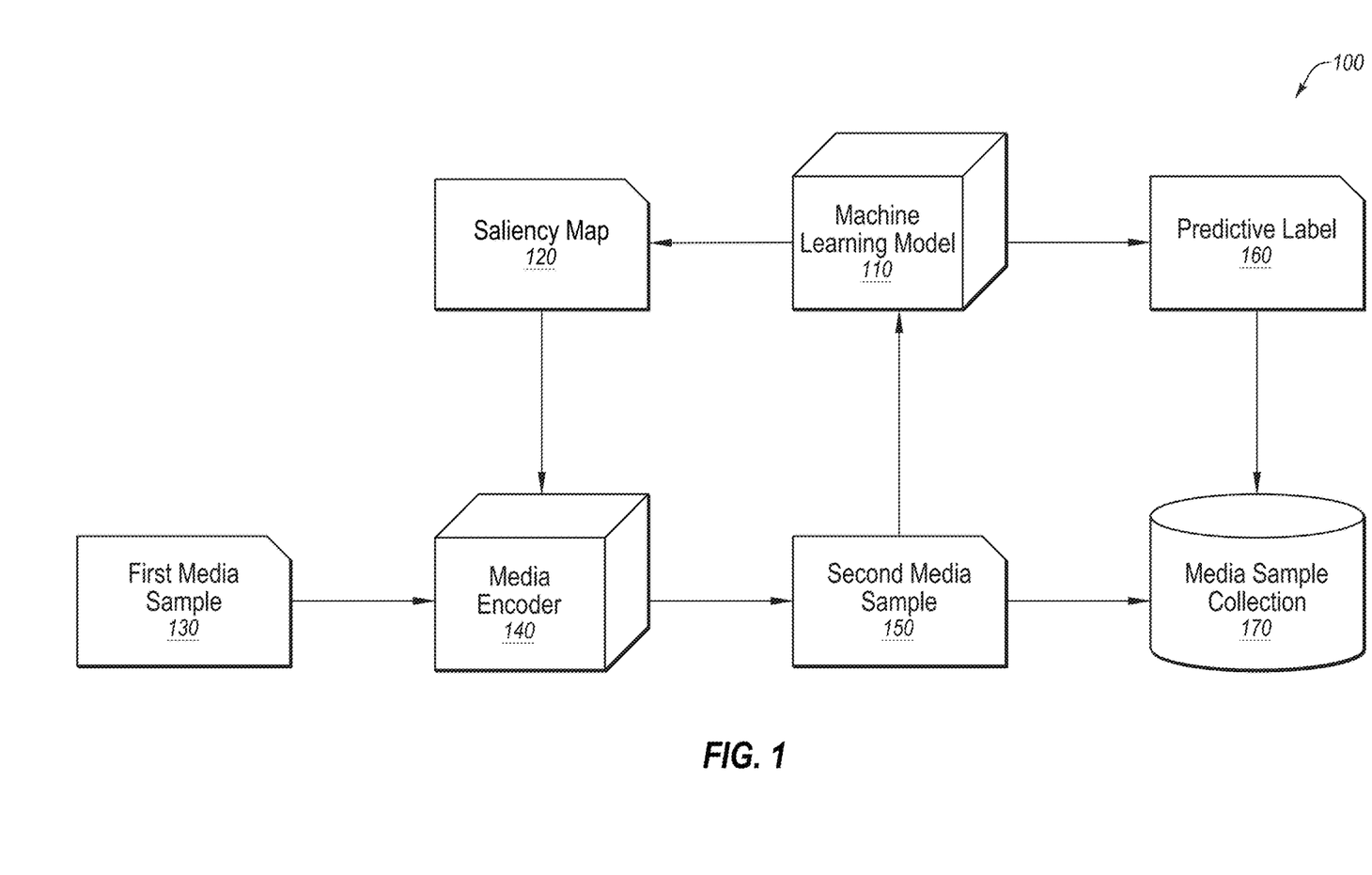
FIG. 1 is a diagram representing an example system related to constructing a saliency map and using the saliency map to encode a media sample.

FIG. 1 is a diagram of an example system 100 related to obtaining a saliency map, modifying media samples based on the saliency map, and labeling the modified media samples by a machine learning model in accordance with one or more embodiments of the present disclosure. The system 100 may include a machine learning model 110 and a media encoder 140. The machine learning model 110 may be trained to label media files of a given media format. The media encoder 140 may obtain a saliency map 120 and encode one or more first media samples 130 according to the saliency map 120 to generate one or more second media samples 150. The machine learning model 110 may obtain the second media sample 150 and output a predictive label 160 categorizing the second media sample 150.

The machine learning model 110 may be configured and/or trained to label media files of a given media type. For example, the machine learning model 110 may perform facial recognition, objection detection, emotion detection, alpha-numerical detection, iris or fingerprint verification, voice recognition, etc. In some embodiments, the machine learning model 110 may rely more heavily on relevant elements of the media file than those that are irrelevant. Such elements of the media files may be identified as having salience to the labeling of the media files by the machine learning model 110. Encoding parameters may be associated with the elements of the media files having salience, and such encoding parameters may be identified, such as by the machine learning model 110, to generate the saliency map 120.

The saliency map 120 may include a number of elements corresponding to aspects of the given media type of the media files. Each of the elements included in the saliency map 120 may correspond to one or more encoding parameters. The encoding parameters may inform how the element corresponding to each of the encoding parameters is modified. For example, a given encoding parameter corresponding to a given element identified as having high salience may indicate the given element should be emphasized, have reduced or no compression, and/or elements near the given element should be compressed more heavily to underscore the given element. Additionally or alternatively, the saliency map 120 may include a value indicative of an importance of the given element to the labeling by the machine learning model 110 of media files, such as the first media samples 130. For example, for a given image certain regions and/or locatable features may include a high value while other regions include a low value. The manner in which the array elements of the saliency map 120 may specify encoding parameters for the corresponding elements of the media samples may be described in further detail below such as in relation to FIG. 6.

The machine learning model 110 may be trained using one or more training media samples, which may include media files related to a given media type. In some embodiments, the training media samples may include media files labeled for training the machine learning model 110. The labels assigned to the training media samples may correspond to one or more of the predictive labels 160. The machine learning model 110 may obtain the labeled training media samples as training data and be trained to output predictive labels 160 for categorizing unlabeled media files, such as the first media samples 130, obtained by the machine learning model 110. For example, the machine learning model 110 may be trained to identify whether a given image is a human face, and if the given image is a human face, whether the human face displays one or more emotions such as happiness, sadness, anxiousness, nervousness, disinterest, etc. The machine learning model 110 may obtain labeled training media samples, sort the training media samples into categories based on the label given to each of the training media samples, and identify patterns in the training media samples included under each label.

Returning to the previous example, the machine learning model 110 may sort one or more given training images into categories such as "not a human face," "human face—happy," "human face—sad," etc. The machine learning model 110 may then identify patterns in the images in the "human face—happy" category as including lips curved upwards, smaller eyes, smiling eyebrows, etc. As another example, the machine learning model 110 may be trained to identify voices included in an audio file. The machine learning model 110 may sort one or more given training audio files into categories such as "no human voices," "human voice—person A," "human voice—person B," etc. based on patterns in the audio files such as vocal pitch, vocabulary choice, speech cadence, etc. As another example, the machine learning model 110 may be trained to identify the identity of a face in an image file. For example, the machine learning model 110 may be trained to identify the identity of a person associated with the face based on a combination of the eyes, nose, mouth, eyebrows, etc. As an additional example, the machine learning model 110 may be trained to identify one or more alpha-numerical characters in an image. For example, the machine learning model 110 may be trained to identify patterns of lines, shapes, etc. to detect letters and/or numbers. Additionally or alternatively, the machine learning mode 110 may be trained to identify where within an image such characters show up (e.g., in a license plate the characters are typically located in a central region of the license plate).

In some embodiments, the machine learning model 110 may be taught parameters for improving perception of a media file (e.g., by the machine learning model 110 and/or a human user). For example, the machine learning model 110 trained based on image data may learn to estimate a minimum and/or a maximum number of pixels to be modified to improve perception of the image. As another example, the machine learning model trained based on audio data may be taught to estimate a volume change needed to affect a change in perceived volume by a human user and/or a change in sound frequency needed to affect a change in perceived audio pitch by the human user.

The machine learning model 110 may obtain new media samples that the machine learning model 110 has previously not seen, such as the first media samples 130. The machine learning model 110 may apply the patterns identified in the training media samples to the new first media samples 130 and categorize the first media samples 130 based on the predictive labels 160. In some embodiments, the first media samples 130 may serve as additional training data for the machine learning model 110 in which elements of the first media samples 130 relevant to the predictive labels 160 are identified by the machine learning model 110. In these and other embodiments, the saliency map 120 may be updated based on the labeling of the first media samples 130 by the machine learning model 110.

The media encoder 140 may obtain the saliency map 120 and the first media samples 130. The media encoder 140 may derive the second media samples 150 by applying the saliency map 120 to the first media samples 130. In some embodiments, the elements of the saliency map 120 may or may not correspond to elements of the first media samples 130 because the saliency map 120 may be generated based on training media samples. In these and other embodiments, the media encoder 140 and/or the machine learning model 110 may identify relationships and/or patterns between elements of the training media samples and elements of the first media samples 130 such that the elements of the saliency map 120 may be applied to the elements of the first media samples 130 yielding the compressed and/or processed elements of the first media samples 130 to yield the second media samples 150. Additionally or alternatively, the saliency map 120 may include a feature-based array with array elements for corresponding features, depending on the operation of the machine learning model 110. For example, if the machine learning model 110 operates to perform facial recognition and/or facial detection, the saliency map 120 may include array elements for eyes, nose, mouth, brows, hairline, teeth, chin, etc. such that as corresponding features are detected in an image, the saliency map 120 elements may be applied to the detected features.

Elements of the second media samples 150 may be emphasized, uncompressed, and/or compressed in a reduced amount compared to other portions of the media samples. Because elements of the second media samples 150 relevant to the machine learning model 110 determining the predictive labels 160 are uncompressed, minimally compressed, emphasized, etc. and/or elements of the second media samples 150 irrelevant to the predictive labels 160 are compressed, the accuracy of predictively labeling the second media samples 150 by the machine learning model 110 may be close to, as high as, and/or higher than the accuracy of predictively labeling other media files.

Predictive labels 160 may include a variety of categorizations for a given set of media files. For example, a given set of media samples may include one or more portraits of human faces, and a predictive label may indicate whether a given image of a human face matches the identity of any of the portraits included in the media sample collection 170. As another example, a given set of media models may include alpha-numerical symbols, such as the alpha-numerical symbols printed on car license plates, and a predictive label may indicate a sequence of the alpha-numerical symbols printed in a given image of a car license plate. As another example, a given set of media samples may include biometric information sets (such as voice samples, fingerprint data, etc.), and a predictive label may indicate whether a given biometric information set matches any of the biometric information sets included in the media sample collection 170.

In some embodiments, the media sample collection 170 may include one or more media files that may serve as a reference for one or more comparisons performed with media files. For example, when performing facial recognition the media sample collection 170 may include a reference face to which future facial images may be compared. In some embodiments, the media sample collection 170 may include second media samples 150 (e.g., compressed versions of the first media sample 130 compressed according to the saliency map 120). In some embodiments, the media sample collection 170 may include first media sample 130 (e.g., uncompressed versions of the media samples).

While described as being used in compression and/or encoding of the media samples, in some embodiments the saliency map 120 may be used in the acquisition of the first media samples 130. For example, when capturing an image or an audio sample, the saliency map may be used to designate bitrates or resolutions for certain regions or features when capturing an image initially in addition to and/or in place of using the saliency map 120 during processing and/or compression.

Modifications, additions, or omissions may be made to the system 100 without departing from the scope of the disclosure. For example, the designations of different elements in the manner described is meant to help explain concepts described herein and is not limiting. For instance, in some embodiments, the machine learning model 110 and the media encoder 140 are delineated in the specific manner described to help with explaining concepts described herein but such delineation is not meant to be limiting. Further, the system 100 may include any number of other elements or may be implemented within other systems or contexts than those described.

Figure 2:
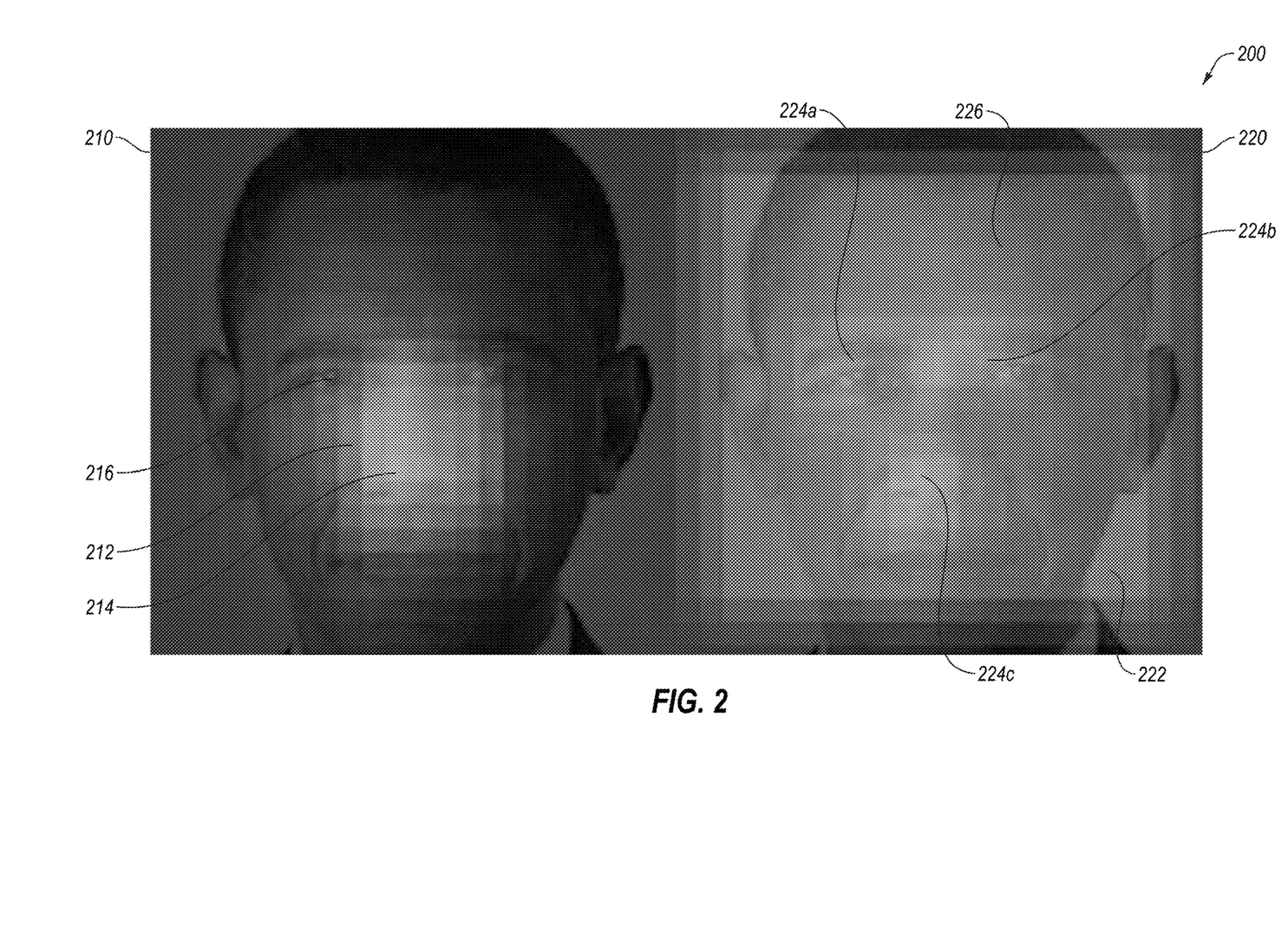
FIG. 2 is an illustration indicating how the saliency map may be generated according to an example embodiment of the present disclosure.

FIG. 2 is an illustration indicating how the saliency map may be generated according to an example embodiment 200 of the present disclosure. The example embodiment 200 may include one or more images, such as a first image 210 and a second image 220. The first image 210 may include a visual representation of a first compression template 212, and the second image 220 may include a visual representation of a second compression template 222 in which the second compression template 222 is informed by a saliency map, such as the saliency map 120 discussed above. The first compression template and the second compression template may represent heat maps in which portions of greater density of stippling correspond to less compression, and portions of lesser density of stippling correspond to greater compression. Or stated another way, the portions of greater density of stippling correspond to greater reliance by a machine learning model in performing its prediction, while regions of lesser density of stippling correspond to lesser reliance by the machine learning model in performing its prediction.

In some embodiments, the first compression template 212 may be focused on a given element of the media sample. The first image 210 may be a given media sample representing a human face. The first compression template 212 may include a first element 214 near the center of the face and second element 216 further away from the center of the face. The first element 214 may indicate that the element of the first image 210 associated with the first element 214 may remain uncompressed and/or be enhanced. The second element 216 may indicate that the second element of the first image 210 associated with the second element 216 may be compressed more than the first element 214, but less than a residual amount (e.g., the portions of the image at the periphery and even further away from the weighted center of the face). Additionally or alternatively, the second element 216 of the first compression template 212 may indicate that the second element of the first image 210 may be enhanced less than the first element 214.

In some embodiments, the second compression template 222 may include a feature-based saliency map. The second image 220 may be the same given media model representing the human face. The second compression template 222 may include one or more elements 224*a-c* corresponding to one or more features of the second image 220 including significant information, such as the eyes and the nose of the human face. Additionally or alternatively, the second compression template 222 may include one or more elements 226 corresponding to elements of the second image 220 including insignificant information, such as the hair, forehead, ears, jaw, etc. of the human face. In these and other embodiments, the elements of the second image 220 corresponding to the elements 224*a-c* may remain uncompressed and/or be enhanced. Additionally or alternatively, the elements of the second image 220 corresponding to the elements 226 may be compressed more than those of the elements 224*a-c* that include significant information.

By utilizing a saliency map such as that illustrated by the second compression template 222, an intelligent amount of compression may be applied such that the performance of the machine learning model may be maintained while still obtaining desired levels of compression of media.

Figure 3:
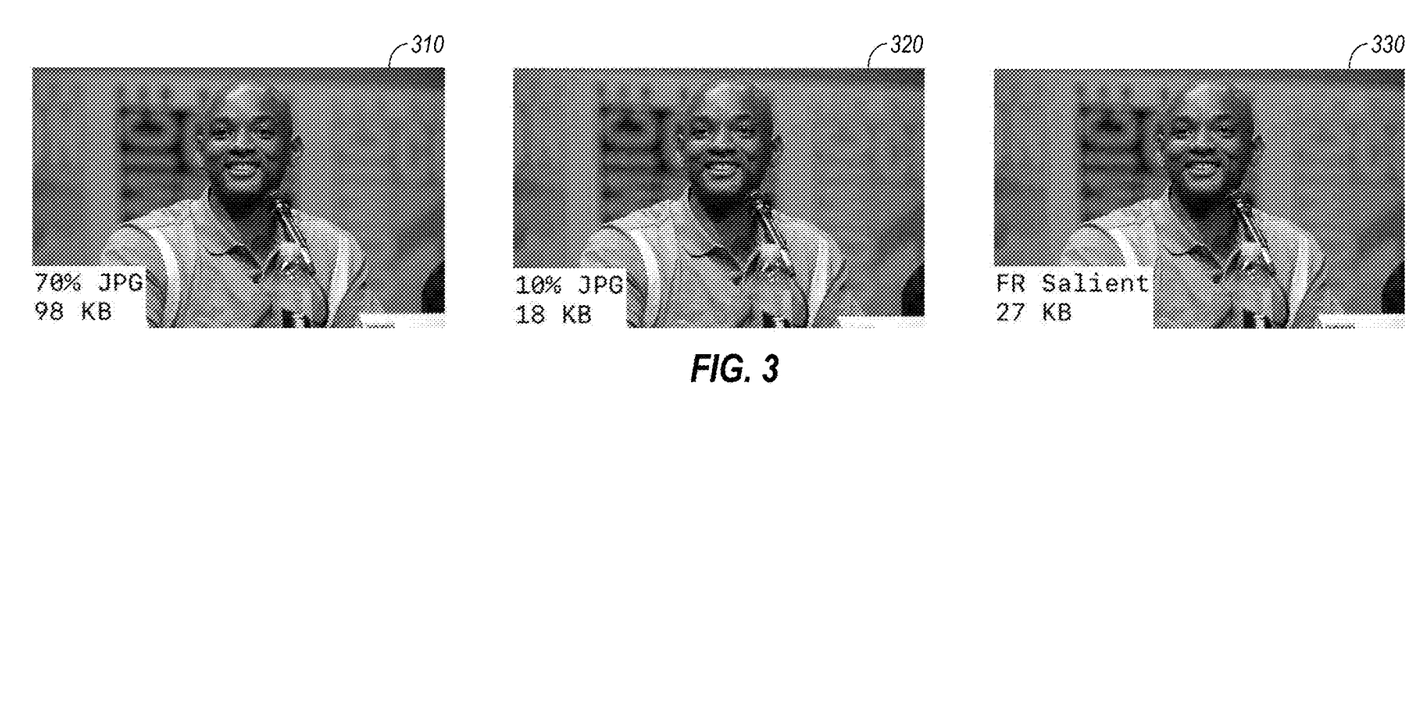
FIG. 3 is a series of images comparing an image compressed by existing image-compression methods and the image compressed by an example embodiment of the present disclosure.

FIG. 3 is a series of images comparing an image compressed by existing image-compression methods and the image compressed by an example embodiment of the present disclosure. A first image 310 may include a compression to approximately 70% of an original size of a .jpg file with a resulting file size of 98 KB. A second image 320 may be compressed by existing image-compression methods to approximately 10% of an original size of the .jpg file with a resulting file size of 18 KB. A third image 330 may be generated by an example embodiment of the present disclosure, such as by the method 600, and may be compressed to a size of 27 KB. The first image 310, the second image 320, and the third image 330 include a background and a subject of the images. The background of the images includes a background panel behind the subject, a water bottle in front of the subject, and a microphone in front of the subject. The subject of the images includes an upper body including a shirt and neck of the subject and a head including a forehead, eyebrows, eyes, a nose, cheeks, a mouth, a chin, and ears of the subject.

The second image 320 and the third image 330 include smaller file sizes than the first image 310 indicating the second image 320 and the third image 330 are more compressed than the first image 310. The third image 330, however, includes sharper facial features relative to the second image 320. Regions of the third image 330 relating to facial features, such as regions around the eyebrows, the eyes, the nose, and the mouth, appear clearer than the same facial features in the second image 320, while regions of the third image 330 unrelated to facial features, such as regions around the background panel, the water bottle, the microphone, the shirt, the neck, and the ears may be compressed in a similar or comparable manner as the same regions in the second image 320.

Figure 4:
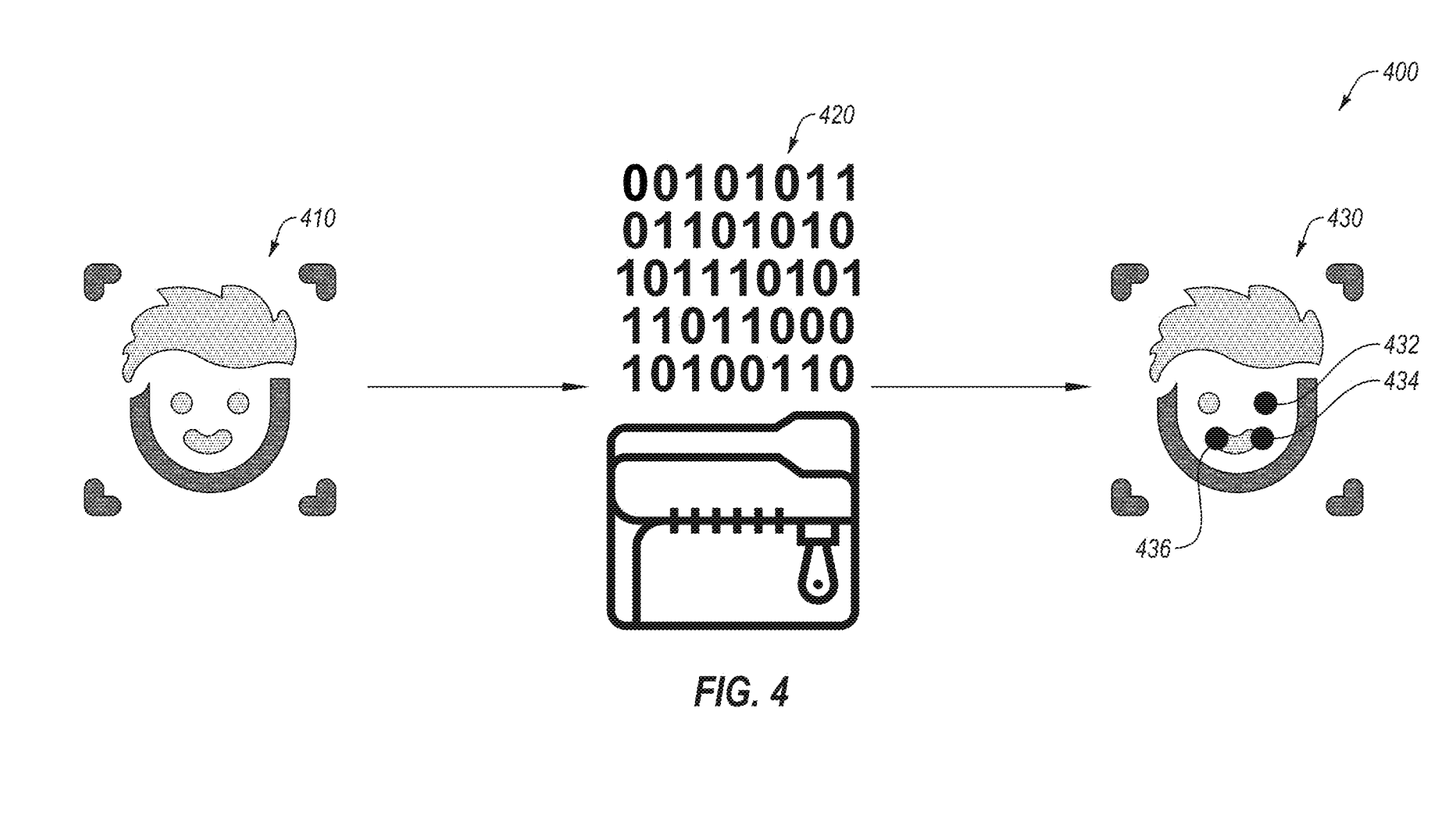
FIG. 4 is a diagram of an example embodiment including compression and labeling of a given media file according to the present disclosure.

FIG. 4 illustrates an example embodiment 400 including compression and labeling of a given media file according to the present disclosure. The example embodiment 400 may include an image 410 that includes a picture of a human face. The image 410 may be obtained by a machine learning model, and a predictive label may be assigned to the image 410. A saliency map 420 may be used to compress the image 410. The saliency map 420 may include an array made of a number of binary array elements. In some embodiments, each binary array element may include a first binary value, such as zero, or a second binary value, such as one, as shown in the saliency map 420. For example, the first binary value may indicate a corresponding element of the image 410 will not be modified (e.g., compressed) in deriving a second image 430, and the second binary value may indicate a corresponding element of the image 410 will be modified in deriving the second image 430. The second image 430 may include one or more uncompressed and/or enhanced elements, such as elements 432, 434, and 436 corresponding to the eyes, left mouth corner, and right mouth corner, respectively. In some embodiments, the second image 430 may be obtained by the machine learning model, and a predictive label may be assigned to the second image 430. Responsive to determining the predictive label assigned to the second image 430 is the same as or similar to the predictive label assigned to the image 410, the second image 430 may be stored in a database along with the predictive label assigned to the second image 430. Compressing, labeling, and/or storing images, such as the second image 430, may enable more accurate searching and/or identification of subject matter captured in the image 410 or similar subject matter. Additionally or alternatively, such compression, labeling, and/or storing images may reduce storage requirements, memory usage, etc. as lower-sized media files may be stored and/or used by the machine learning model in generating the predictive label.

Figure 5A:
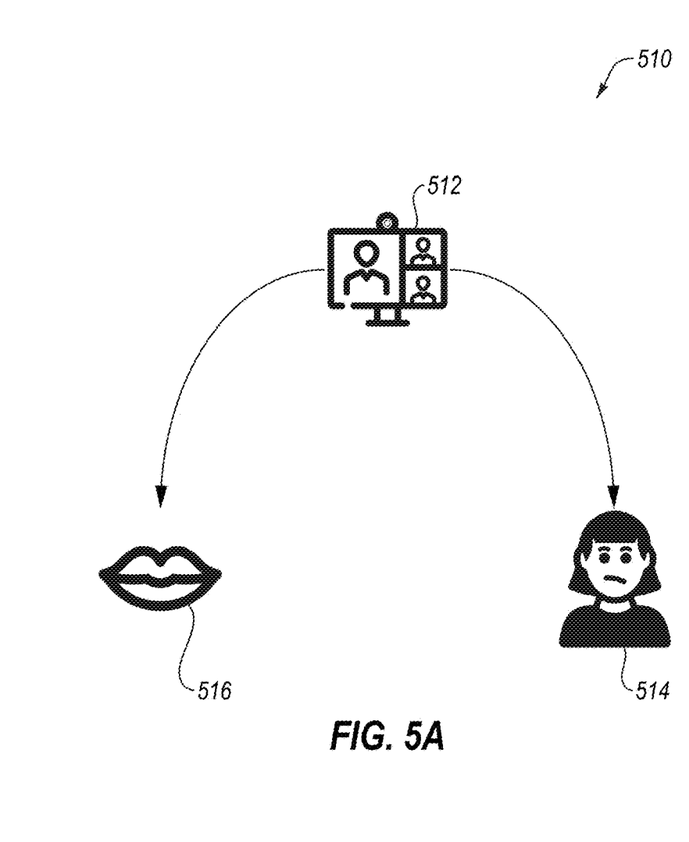
FIG. 5A is a diagram of an example embodiment including compression and labeling of a given media file according to the present disclosure.

FIG. 5A illustrates an example embodiment 510 including a video conference 512. The video conference 512 may include a video feed displaying one or more people 514. The video conference 512 may display facial expressions 516 of the people 514 displayed in the video feed. In some embodiments, an image from the video conference 512 including the people 514 and/or the facial expressions 516 may be obtained as a media file and compressed according to the present disclosure. The image may include a screenshot of the video conference 512 at a given point in time. Additionally or alternatively, a video stream associated with the video conference 512 may be obtained as a media file and compressed according to the present disclosure. The video stream may be compressed to ensure a consistent bitrate and compensate for connection instability between participants in the video conference 512.

In some embodiments, elements of the media file relating to the facial expressions 516 may remain uncompressed and/or be emphasized such that the machine learning model may label the media file for emotion detection, micro expression analysis, lie detection, etc. For example, a first saliency map may be used for emotion detection, lie detection, etc.

In some embodiments, the same or a different saliency map may be used for facial recognition to identify the identity of the people 514. In these and other embodiments, elements of the media file relating to the people 514 may remain uncompressed and/or be emphasized such that the people 514 may be more clearly delineated from a background, which may be changed to display different backgrounds via background segmentation.

Figure 5B:
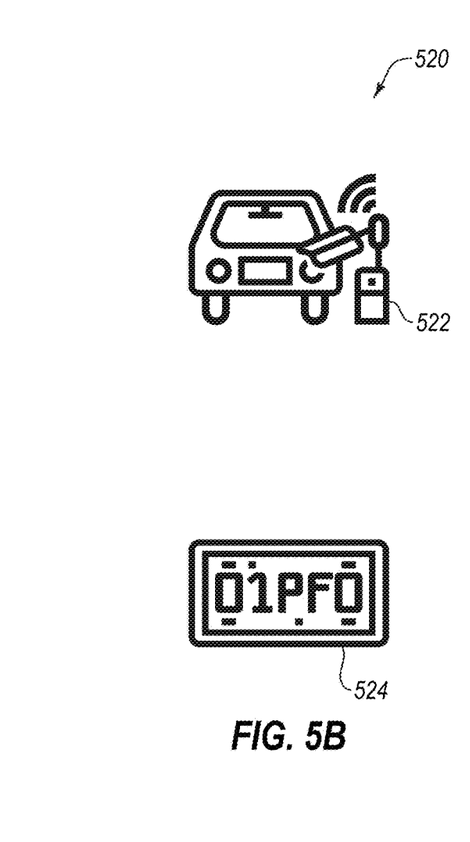
FIG. 5B is a diagram of an example embodiment including compression and labeling of a given media file according to the present disclosure.

FIG. 5B illustrates an example embodiment 520 including a license plate image 524. The license plate image 524 may be captured by a camera 522 positioned to take pictures of cars passing a given location. Elements of the license plate image 524 including alphanumeric symbols may be identified as having greater salience than other elements of the license plate image 524 (e.g., peripheries of the license plate, a car bumper, etc.). Compression and/or other modification of the license plate image 524 based on the saliency map may improve detection of license plates and/or storage of license plate images. In some embodiments, the saliency map may be used in determining which regions of the image to capture with higher resolution while capturing other regions of the image with lower resolution.

Figure 5C:
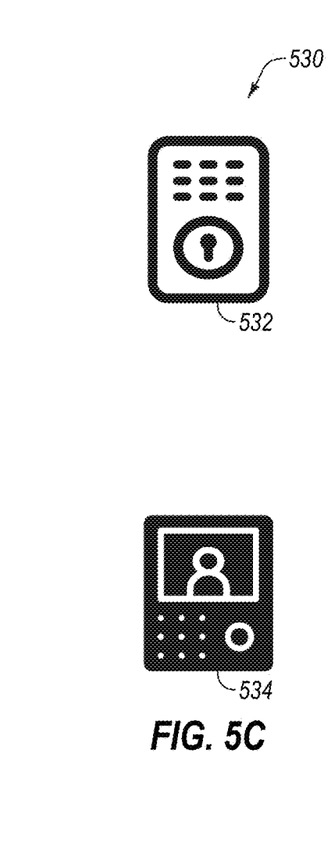
FIG. 5C is a diagram of an example embodiment including compression and labeling of a given media file according to the present disclosure.

FIG. 5C illustrates an example embodiment 530 including an access control system 532 that accepts facial recognition and/or another biometric file 534. The biometric file 534 may be compressed and/or otherwise modified based on the saliency map such that encoding of the biometric file 534 and/or recognition of the biometric file 534 by the access control system 532 is not significantly impaired, the same as, or improved compared to performing facial recognition on an uncompressed version of the biometric file 543.

Figure 6:
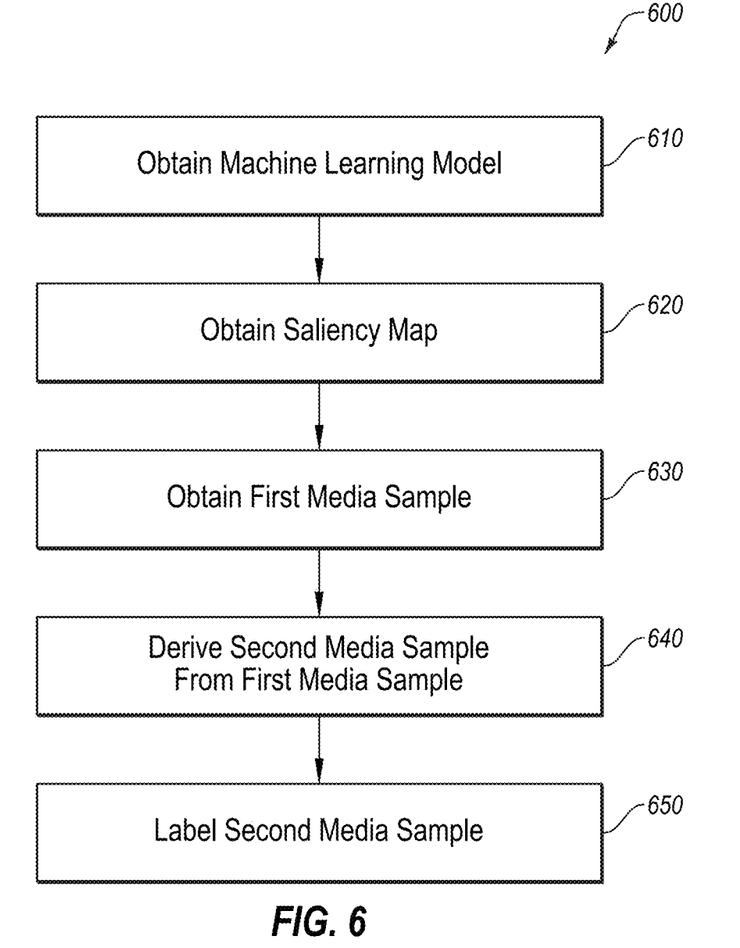
FIG. 6 is a flowchart representing an example method of generating a second media sample using the saliency map.

FIG. 6 is a flowchart of an example method 600 of generating a second media sample based on a first media sample compressed and/or otherwise modified based on the saliency map, in accordance with one or more embodiments of the present disclosure. The method 600 may be performed by any suitable system, apparatus, or device. For example, the system 100 and/or components thereof (such as the machine learning model 110 and/or the media encoder 140) may perform one or more of the operations associated with the method 600. Although illustrated with discrete blocks, the steps and operations associated with one or more of the blocks of the method 600 may be divided into additional blocks, combined into fewer blocks, or eliminated, depending on the particular implementation.

At block 610, the machine learning model may be obtained. The machine learning model may be configured to label media files of a given media type. In some embodiments, a predictive label may be selected from a group including one or more predictive labels by the machine learning model to describe a given media file. In these and other embodiments, the obtained machine learning model may be previously trained based on a set of training media samples which may or may not be compressed and/or otherwise processed using a saliency map.

At block 620, a saliency map may be obtained. The saliency map may include a number of elements corresponding to aspects of the given media format, each of the elements corresponding to one or more encoding parameters. A given encoding parameter of an associated element may be based on the salience of the associated element as identified by the machine learning model. The saliency map may describe encoding of a media file in the given media format based on the encoding parameters. In some embodiments, the saliency map may be constructed based on the training of the obtained machine learning model.

At block 630, one or more first media samples may be obtained. The first media samples may include any media files having a same media type regardless of file format associated with the media files. For example, a first set of first media samples may include image-type media files of various file formats (.jpg, .png, .gif, etc.), and a second set of first media samples may include audio-type media files of various file formats (.wav, .mp3, .aiff, etc.).

At block 640, a second media sample may be derived from each first media sample. For example, the second media sample may be obtained by applying the encoding identified in the saliency map to the first media sample. In some embodiments, the second media sample may include a compressed media file resulting from compression of the first media sample according to the saliency map. In these and other embodiments, the second media sample may include a smaller file size than the first media sample. Additionally or alternatively, the second media sample may include one or more first elements in which information (e.g., a region of an image, a set of frequencies in an audio file, etc.) is more compressed than corresponding elements of the first media sample such that the first elements may be perceived as having lower quality than the corresponding uncompressed elements of the first media sample. Additionally or alternatively, the second media sample may include one or more second elements in which information is uncompressed or not as compressed as the first elements such that the second elements may be perceived as having the same or similar quality as the corresponding elements of the first media sample.

In some embodiments, the encoding parameters to be modified by the saliency map may include general modifications (e.g., compressing specified elements of the first media sample by a specified amount) and/or specific modifications (e.g., modifying parameters for luma and/or chroma channels of a given first media sample that is a colored image). Additionally or alternatively, the saliency map may indicate encoding parameters and/or elements of the first media sample to be enhanced. Enhancement of an element of the first media sample may include encoding the element at a higher resolution and/or bit rate. For example, a given first media sample may include an image. One or more elements of the given first media sample may be identified based on the saliency map and enhanced via contrast enhancement, spatial filtering, etc.

In some embodiments, the modification of the first media sample based on the saliency map may be hard coded. For example, a user may specify an instruction to encode significant elements identified in the saliency map at a higher resolution and/or bitrate. Additionally or alternatively, the machine learning model may identify encoding parameters to be modified and/or a degree of modification for identified encoding parameters.

In some embodiments, the saliency map may be applied to the acquisition of a media sample rather than encoding/compressing of a media file.

At block 650, the second media sample may be labeled by the machine learning model. By the second media sample emphasizing elements of the media file as identified by the saliency map (e.g., not compressing certain elements at all or as much as other elements), labeling accuracy of the second media sample may be the same, similar to, and/or improved relative to labeling accuracy of the first media sample from which the second media sample is derived. Additionally or alternatively, the labeling accuracy of the second media sample may be maintained above a threshold of accuracy. In some embodiments, elements of the first media sample that the machine learning model has identified as being relevant to the labeling may be emphasized in the second media sample such that the machine learning model may more easily and/or accurately utilize the relevant elements when labeling the second media sample.

Modifications, additions, or omissions may be made to the method 600 without departing from the scope of the disclosure. For example, the designations of different elements in the manner described is meant to help explain concepts described herein and is not limiting. Further, the method 600 may include any number of other elements or may be implemented within other systems or contexts than those described.

Figure 7:
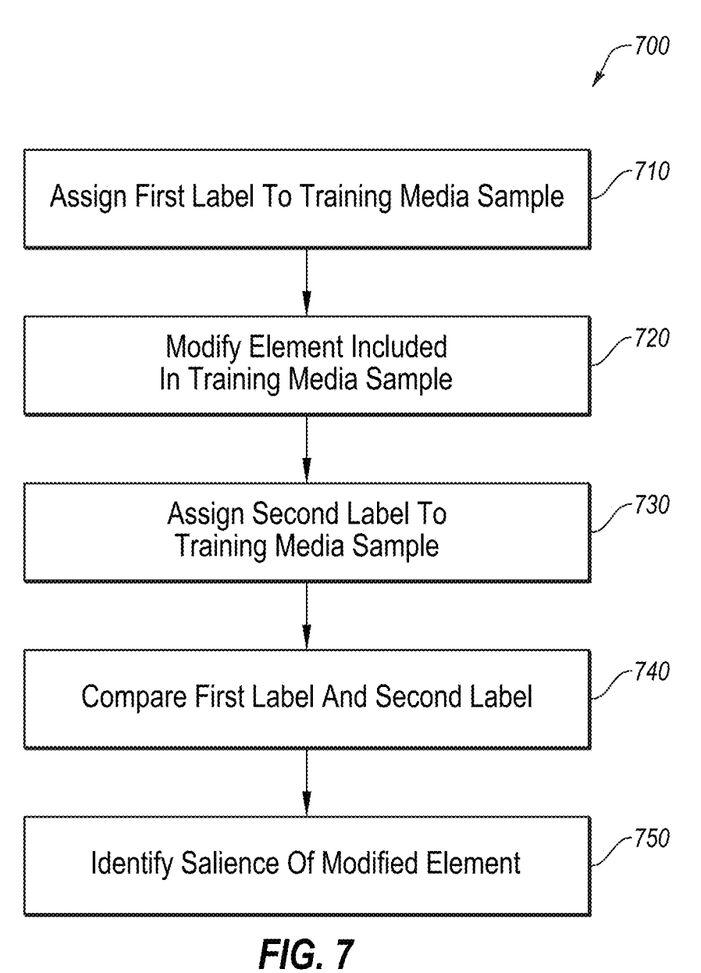
FIG. 7 is a flowchart representing an example method of training a machine learning model using the saliency map and one or more media samples generated based on the saliency map.

FIG. 7 is a flowchart of an example method 700 of identifying the salience of elements included in a media file. The method 700 may be performed by any suitable system, apparatus, or device, such as the system 100 of FIG. 1. For example, the machine learning model 110 and/or the media encoder 140 may perform one or more of the operations associated with the method 700. Although illustrated with discrete blocks, the steps and operations associated with one or more of the blocks of the method 700 may be divided into additional blocks, combined into fewer blocks, or eliminated, depending on the particular implementation.

At block 710, a first label may be assigned to a training media sample. The training media sample may be obtained by a machine learning model, such as the machine learning model 110, and the machine learning model may categorize the training media sample using one or more labels of a group of predictive labels. For example, the training media sample may be assigned a first label (or labels) based on the categorizing by the machine learning model. Additionally or alternatively, the first label may be assigned to the training media sample by a user.

At block 720, an element included in the training media sample may be modified. Labeling the training media sample may depend on one or more elements of the training media sample in which the elements of the training media sample are identified by the machine learning model. In some embodiments, each element of the training media sample may be iteratively modified to identify the elements on which labeling of the training media sample depends. In these and other embodiments, the elements identified by the machine learning model may be identified based on more than one training media samples such that the identified elements represent salience of elements across multiple training media samples.

At block 730, a second label may be assigned to the training media sample including the modified element. In some embodiments, the training media sample including the modified element may be obtained by the machine learning model and treated as a second training media sample for labeling purposes. The machine learning model may assign a second label to the second training media sample based on rules, heuristics, patterns, etc. that the machine learning model identified from assignment of the first label to the training media sample.

At block 740, the first label and the second label associated with the same training media sample may be compared. In some embodiments, the first label and the second label may be selected from a group including a number of predictive labels. In these and other embodiments, the first label and the second label may be compared to determine whether the two labels are the same label selected from the group of predictive labels.

Additionally or alternatively, the first label and the second label may be selected from an organically generated list (e.g., each label includes a number without a lower and/or an upper bound). Additionally or alternatively, the first label and the second label may include more than one component to each label (e.g., a machine learning model configured to label images of farm animals may include labels having a color component, an animal-species component, and a numerical component). In these and other embodiments, the first label and the second label may be compared to determine whether the two labels are similar to one another. In some embodiments, similarity between the first label and the second label may be determined based on a threshold as defined by a user and/or the machine learning model. For example, two numerical labels may be considered similar responsive to the two numerical labels being within a threshold distance of one another. As another example, two labels including a number of components may be considered similar responsive to the two labels including a threshold number of same component labels.

At block 750, salience of the element may be identified based on the comparison between the first label and the second label. In some embodiments, a given element may be identified as being salient to the media file with which the given element is associated based on the first label and the second label being different and/or dissimilar from one another. For example, because the second label was different when the element was modified, compressed, or otherwise reduced in quality, the element modified at the block 720 may have salience in the labeling performed by the machine learning model. Responsive to the machine learning model determining the first label and the second label are different and/or dissimilar from one another, the modified element may be identified as contributing to the difference and/or dissimilarity between the two labels. Additionally or alternatively, because the second label corresponds to the second training media sample and the second training media sample represents the training media sample including a modified element, the second label may frequently be the same and/or similar to the first label, which may suggest that the modified element and/or the amount of modification may have a low salience.

Modifications, additions, or omissions may be made to the method 700 without departing from the scope of the disclosure. For example, the designations of different elements in the manner described is meant to help explain concepts described herein and is not limiting. Further, the method 700 may include any number of other elements or may be implemented within other systems or contexts than those described.

Figure 8:
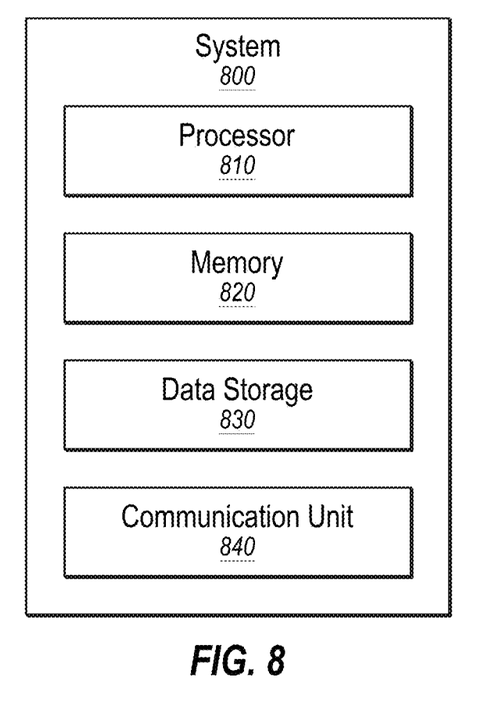
FIG. 8 is an example computing system.

FIG. 8 illustrates an example computing system 800, according to at least one embodiment described in the present disclosure. The computing system 800 may include a processor 810, a memory 820, a data storage 830, and/or a communication unit 840, which all may be communicatively coupled. Any or all of the system 100 of FIG. 1 may be implemented as a computing system consistent with the computing system 800, such as the machine learning model 110 and/or the media encoder 140.

Generally, the processor 810 may include any suitable special-purpose or general-purpose computer, computing entity, or processing device including various computer hardware or software modules and may be configured to execute instructions stored on any applicable computer-readable storage media. For example, the processor 810 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 8, it is understood that the processor 810 may include any number of processors distributed across any number of network or physical locations that are configured to perform individually or collectively any number of operations described in the present disclosure. In some embodiments, the processor 810 may interpret and/or execute program instructions and/or process data stored in the memory 820, the data storage 830, or the memory 820 and the data storage 830. In some embodiments, the processor 810 may fetch program instructions from the data storage 830 and load the program instructions into the memory 820.

After the program instructions are loaded into the memory 820, the processor 810 may execute the program instructions, such as instructions to perform methods 600 and/or 700 of FIGS. 6 and 7, respectively. For example, the processor 810 may obtain instructions regarding obtaining the machine learning model, obtaining the saliency map, obtaining the first media sample, deriving the second media sample from the first media sample, and/or labeling the second media sample.

The memory 820 and the data storage 830 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 810. For example, the memory 820 and/or the data storage 830 may store obtained media models, constructed saliency maps, and/or media samples as described in relation to FIGS. 1-7. In some embodiments, the computing system 800 may or may not include either of the memory 820 and the data storage 830.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 810 to perform a certain operation or group of operations.

The communication unit 840 may include any component, device, system, or combination thereof that is configured to transmit or receive information over a network. In some embodiments, the communication unit 840 may communicate with other devices at other locations, the same location, or even other components within the same system. For example, the communication unit 840 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 840 may permit data to be exchanged with a network and/or any other devices or systems described in the present disclosure. For example, the communication unit 840 may allow the computing system 800 to communicate with other systems, such as computing devices and/or other networks.

One skilled in the art, after reviewing this disclosure, may recognize that modifications, additions, or omissions may be made to the computing system 800 without departing from the scope of the present disclosure. For example, the computing system 800 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:

obtaining a machine learning model configured to label media files of a given type corresponding to a type of training media samples, wherein the given type of the media files comprises at least one of an image type, an audio type, or a video type;

assigning, by the machine learning model, a label to a training media sample comprising a plurality of elements;

modifying an element of the plurality of elements to generate an updated training media sample;

assigning, by the machine learning model, a label to the updated training media sample;

comparing the label assigned to the training media sample to the label assigned to the updated training media sample;

determining, using the machine learning model, a salience of the element that was modified based on the comparison of the labels;

generating, using the machine learning model, a saliency map based on a plurality of training media samples, the saliency map including a plurality of values corresponding to elements of the saliency map, each element of the plurality of elements corresponding to at least one value, each of the values correspond to the salience of the corresponding element for perception of the media files by a computer determined by the machine learning model, and each of the values indicate an importance of a corresponding element of the saliency map in assigning a label to a media sample;

obtaining a first media sample of the given type, the first media sample having a first sample size;

compressing elements of the first media sample according to the values corresponding to the plurality of elements of the saliency map to generate a second media sample having a second sample size, wherein the second sample size is smaller than the first sample size;

identifying, using the machine learning model, a pattern between the elements of the second media sample and elements of the training media sample; and assigning, by the machine learning model, a label to the second media sample based on the identified pattern between the elements of the second media sample and the elements of the training media sample.

2. The method of claim 1, further comprising verifying labeling accuracy of the machine learning model, wherein verifying the labeling accuracy comprises:

labeling, by the machine learning model, the first media sample;

comparing a first label corresponding to the first media sample as labeled by the machine learning model and a second label corresponding to the second media sample as labeled by the machine learning model; and updating one or more of the values of the saliency map responsive to the first label and the second label being different based on the comparing.

3. The method of claim 1, further comprising verifying labeling accuracy of the machine learning model, wherein verifying the labeling accuracy comprises:

labeling, by the machine learning model, the first media sample;

comparing a first label corresponding to the first media sample as labeled by the machine learning model and a second label corresponding to the second media sample as labeled by the machine learning model; and storing the second media sample in a database responsive to the first label and the second label being the same based on the comparing.

4. The method of claim 1, wherein:

each of the values included in the saliency map describes a degree of compression of a respective element corresponding to a respective encoding parameter.

5. The method of claim 1, wherein labeling media files by the machine learning model includes at least one of license plate identification, emotion detection, lie detection, background segmentation, facial recognition, or biometrics recognition.

6. One or more non-transitory computer-readable storage media configured to store instructions that, in response to being executed, cause a system to perform operations, the operations comprising:

obtaining a machine learning model configured to label media files of a given type corresponding to a type of training media samples, wherein the given type of the media files comprises at least one of an image type, an audio type, or a video type;

assigning, by the machine learning model, a label to a training media sample comprising a plurality of elements;

modifying an element of the plurality of elements to generate an updated training media sample;

assigning, by the machine learning model, a label to the updated training media sample;

comparing the label assigned to the training media sample to the label assigned to the updated training media sample;

determining, using the machine learning model, a salience of the element that was modified based on the comparison of the labels;

generating, using the machine learning model, a saliency map based on a plurality of training media samples, the saliency map including a plurality of values corresponding to elements of the saliency map, each element of the plurality of elements corresponding to at least one value, each of the values correspond to the salience of the corresponding element for perception of the media files by a computer determined by the machine learning model, and each of the values indicate an importance of a corresponding element of the saliency map in assigning a label to a media sample;

obtaining a first media sample of the given type, the first media sample having a first sample size;

compressing elements of the first media sample according to the values corresponding to the plurality of elements of the saliency map to generate a second media sample having a second sample size, wherein the second sample size is smaller than the first sample size;

identifying, using the machine learning model, a pattern between the elements of the second media sample and elements of the training media sample; and assigning, by the machine learning model, a label to the second media sample based on the identified pattern between the elements of the second media sample and the elements of the training media sample.

7. The one or more non-transitory computer-readable storage media of claim 6, further comprising verifying labeling accuracy of the machine learning model, wherein verifying the labeling accuracy comprises:

labeling, by the machine learning model, the first media sample;

comparing a first label corresponding to the first media sample as labeled by the machine learning model and a second label corresponding to the second media sample as labeled by the machine learning model; and updating one or more of the values of the saliency map responsive to the first label and the second label being different based on the comparing.

8. The one or more non-transitory computer-readable storage media of claim 6, further comprising verifying labeling accuracy of the machine learning model, wherein verifying the labeling accuracy comprises:

labeling, by the machine learning model, the first media sample;

comparing a first label corresponding to the first media sample as labeled by the machine learning model and a second label corresponding to the second media sample as labeled by the machine learning model; and storing the second media sample in a database responsive to the first label and the second label being the same based on the comparing.

9. The one or more non-transitory computer-readable storage media of claim 6, wherein:

each of the values included in the saliency map describes a degree of compression of a respective element corresponding to a respective encoding parameter.

10. The one or more non-transitory computer-readable storage media of claim 6, wherein labeling media files by the machine learning model includes at least one of license plate identification, emotion detection, lie detection, background segmentation, facial recognition, or biometrics recognition.

11. A system comprising:

one or more processors; and one or more non-transitory computer-readable storage media configured to store instructions that, in response to being executed, cause the system to perform operations, the operations comprising:

obtaining a machine learning model configured to label media files of a given type corresponding to a type of training media samples, wherein the given type of the media files comprises at least one of an image type, an audio type, or a video type;

assigning, by the machine learning model, a label to a training media sample comprising a plurality of elements;

modifying an element of the plurality of elements to generate an updated training media sample;

assigning, by the machine learning model, a label to the updated training media sample;

comparing the label assigned to the training media sample to the label assigned to the updated training media sample;

determining, using the machine learning model, a salience of the element that was modified based on the comparison of the labels;

generating, using the machine learning model, a saliency map based on a plurality of training media samples, the saliency map including a plurality of values corresponding to elements of the saliency map, each element of the plurality of elements corresponding to at least one value, each of the values correspond to the salience of the corresponding element for perception of the media files by a computer determined by the machine learning model, and each of the values indicate an importance of a corresponding element of the saliency map in assigning a label to a media sample;

obtaining a first media sample of the given type, the first media sample having a first sample size;

compressing elements of the first media sample according to the values corresponding to the plurality of elements of the saliency map to generate a second media sample having a second sample size, wherein the second sample size is smaller than the first sample size; and assigning, by the machine learning model, a label to the second media sample.

12. The system of claim 11, further comprising verifying labeling accuracy of the machine learning model, wherein verifying the labeling accuracy comprises:

labeling, by the machine learning model, the first media sample;

comparing a first label corresponding to the first media sample as labeled by the machine learning model and a second label corresponding to the second media sample as labeled by the machine learning model; and updating one or more of the values of the saliency map responsive to the first label and the second label being different based on the comparing.

13. The system of claim 11, further comprising verifying labeling accuracy of the machine learning model, wherein verifying the labeling accuracy comprises:

labeling, by the machine learning model, the first media sample;

comparing a first label corresponding to the first media sample as labeled by the machine learning model and a second label corresponding to the second media sample as labeled by the machine learning model; and storing the second media sample in a database responsive to the first label and the second label being the same based on the comparing.

14. The system of claim 11, wherein:

each of the values included in the saliency map describes a degree of compression of a respective element corresponding to a respective encoding parameter.

15. The system of claim 11, wherein labeling media files by the machine learning model includes at least one of license plate identification, emotion detection, lie detection, background segmentation, facial recognition, or biometrics recognition.

* * * * *